United States Patent
Koti et al.

(10) Patent No.: US 12,054,040 B2
(45) Date of Patent: Aug. 6, 2024

(54) FUEL CELL VEHICLE RADIATOR PLACEMENT AND ORIENTATION

(71) Applicant: CUMMINS INC, Columbus, IN (US)

(72) Inventors: Archit N. Koti, Sunnyvale, CA (US); Nilesh Hasabnis, Columbus, IN (US); Jairo Martinez Garcia, Albany, CA (US); Mario Miranda, Columbus, IN (US); Yongfei Yu, Dublin, CA (US); Patrick Kaufman, Vacaville, CA (US); Jacky Wei, Beijing (CN); Taojie Chen, Beijing (CN); Aiden Wang, Beijing (CN); Jing Ma, Beijing (CN); Lixin Peng, Beijing (CN); Yong Xia, Wuhan (CN)

(73) Assignee: CUMMINS INC, Columbus, IN (US)

( * ) Notice: Subject to any disclaimer, the term of this patent is extended or adjusted under 35 U.S.C. 154(b) by 148 days.

(21) Appl. No.: 17/673,634

(22) Filed: Feb. 16, 2022

(65) Prior Publication Data

US 2023/0234435 A1    Jul. 27, 2023

(51) Int. Cl.
*B60K 11/04* (2006.01)
*B60K 15/03* (2006.01)

(52) U.S. Cl.
CPC .............. *B60K 11/04* (2013.01); *B60K 15/03* (2013.01)

(58) Field of Classification Search
CPC ...... B60K 11/04; B60K 15/03; B60K 15/073; B60K 2015/0637; B60K 2015/0636; B60L 50/72
See application file for complete search history.

(56) References Cited

U.S. PATENT DOCUMENTS

| | | | | |
|---|---|---|---|---|
| 3,715,001 | A * | 2/1973 | Wilson | B62D 49/005 180/68.4 |
| 3,827,523 | A * | 8/1974 | Williams | F01P 5/08 165/44 |
| 3,929,202 | A * | 12/1975 | Hobbensiefken | B62D 35/001 296/180.2 |
| 4,345,641 | A * | 8/1982 | Hauser | B60K 11/04 165/41 |
| 4,362,208 | A * | 12/1982 | Hauser | B60K 11/08 165/44 |
| 6,386,306 | B2 * | 5/2002 | Contoli | E02F 3/286 180/291 |
| 6,435,264 | B1 * | 8/2002 | Konno | F01P 3/18 165/41 |
| 6,793,028 | B2 * | 9/2004 | Pack | F01P 3/18 180/68.1 |
| 7,419,021 | B2 * | 9/2008 | Morrow | B60K 6/46 296/190.08 |
| 9,884,552 | B2 * | 2/2018 | Sloan | F17C 13/083 |
| 10,696,155 | B2 * | 6/2020 | Sloan | B60T 17/06 |
| 11,015,871 | B2 * | 5/2021 | Wallet-Laily | F28D 1/05366 |
| 11,345,331 | B2 * | 5/2022 | McKibben | B60W 20/10 |
| 2002/0053480 | A1 * | 5/2002 | Pack | B60K 11/04 180/374 |
| 2008/0041558 | A1 * | 2/2008 | Kardos | F01P 3/18 165/42 |

(Continued)

*Primary Examiner* — Jeffrey J Restifo
(74) *Attorney, Agent, or Firm* — Barnes & Thornburg LLP

(57) ABSTRACT

The present disclosure relates to improved placement, positioning, and/or orientation of radiators and baffles on a vehicle to improve and/or optimize air flow, radiator, and fuel cell performance.

20 Claims, 10 Drawing Sheets

(56) References Cited

U.S. PATENT DOCUMENTS

| | | | |
|---|---|---|---|
| 2009/0078394 A1* | 3/2009 | Weatherup | B60K 11/04 165/47 |
| 2010/0018732 A1* | 1/2010 | Daniel | B60K 11/04 172/781 |
| 2011/0288738 A1* | 11/2011 | Donnelly | F02D 19/0665 701/99 |
| 2012/0228307 A1* | 9/2012 | Simmons | B60K 15/07 29/428 |
| 2014/0056729 A1* | 2/2014 | Pawlick | F04B 17/06 417/234 |
| 2014/0061266 A1* | 3/2014 | Milton | F17C 5/06 224/404 |
| 2014/0069972 A1* | 3/2014 | Willemsen | B60R 9/06 224/401 |
| 2014/0116658 A1* | 5/2014 | Kappelman | B60K 11/04 165/121 |
| 2014/0137953 A1* | 5/2014 | Gibb | B60K 15/07 137/351 |
| 2015/0108747 A1* | 4/2015 | Goedken | B60K 15/07 280/834 |
| 2017/0129330 A1* | 5/2017 | Sloan | F17C 13/08 |
| 2017/0211890 A1* | 7/2017 | Cummins | F01P 3/18 |
| 2017/0282710 A1* | 10/2017 | Sloan | F17C 13/084 |
| 2021/0101473 A1* | 4/2021 | Kondo | B60K 15/01 |
| 2021/0129659 A1* | 5/2021 | Andersson | H01M 10/6568 |
| 2021/0135255 A1* | 5/2021 | Sawada | H01M 8/04708 |
| 2021/0155224 A1* | 5/2021 | McKibben | B60L 58/40 |
| 2021/0221223 A1* | 7/2021 | Sawada | B60K 15/063 |
| 2022/0016973 A1* | 1/2022 | Mori | B60K 15/03 |
| 2022/0185089 A1* | 6/2022 | Hendriks | H01M 16/006 |
| 2022/0371434 A1* | 11/2022 | Andersson | B62D 35/001 |
| 2022/0396143 A1* | 12/2022 | Zhang | B60K 15/07 |
| 2023/0044629 A1* | 2/2023 | Pubrat | H01M 8/04067 |
| 2023/0226903 A1* | 7/2023 | Van Der Knaap | B60K 11/04 180/68.1 |
| 2023/0234435 A1* | 7/2023 | Koti | B60K 15/03 180/68.4 |

\* cited by examiner

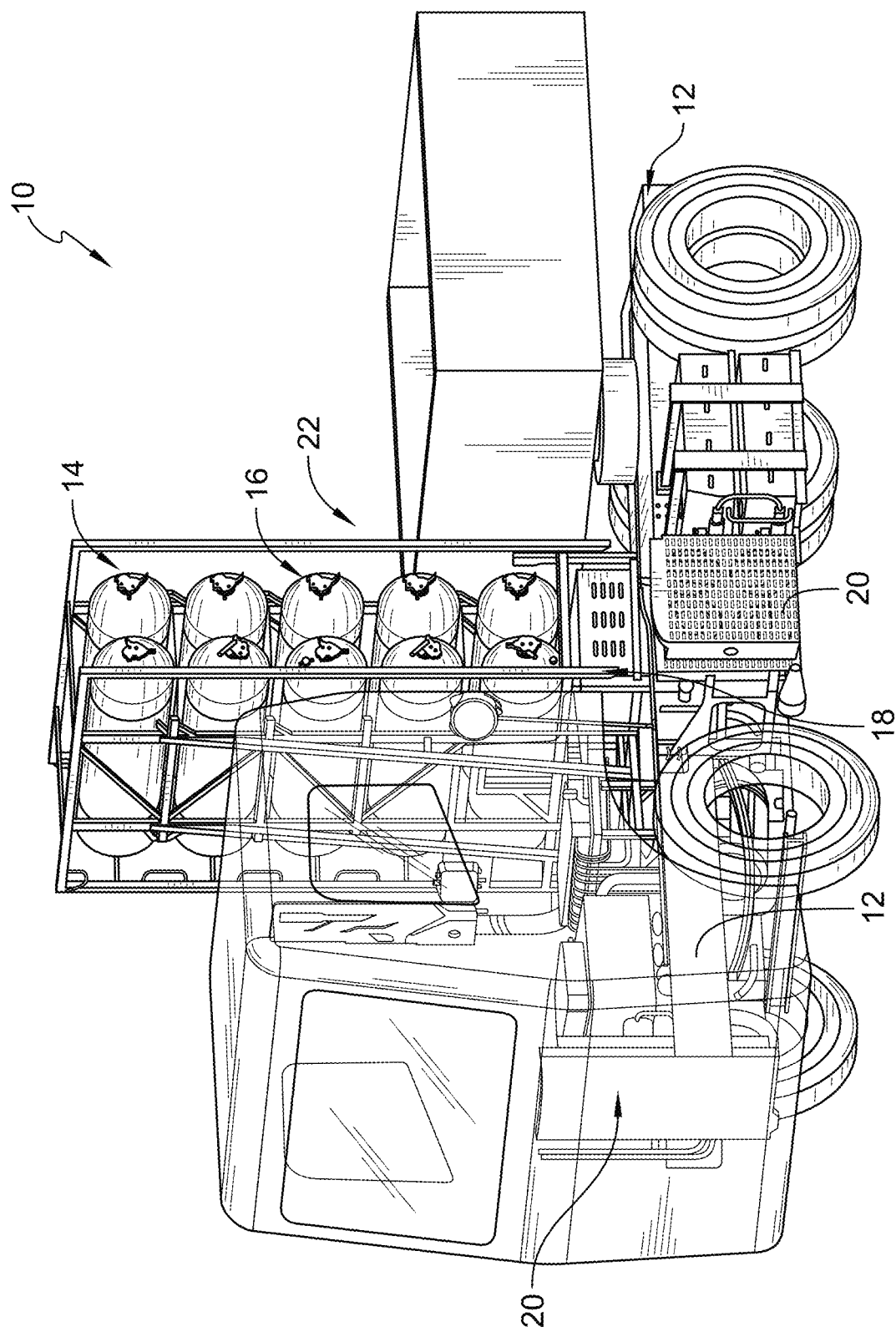

| | BASELINE | CONCEPT 1 | CONCEPT 1A | CONCEPT 1B | CONCEPT 2 | CONCEPT 3 | CONCEPT 4 | CONCEPT 5 | CONCEPT 6 | CONCEPT 7 |
|---|---|---|---|---|---|---|---|---|---|---|
| COOLANT INLET TEMPERATURE (°C) | 107.0 | 87.8 | 92.9 | 96.6 | 93.6 | 86.6 | 83.4 | 88.7 | 117.7 | 85.6 |
| RISE OVER AMBIENT AIR (°C) | 28.9 | 11.4 | 14.2 | 10.5 | 15.7 | 8.9 | 4.2 | 8.5 | 39.1 | 3.2 |
| AIR MASS FLOW RATE (kg/s) | 4.17 | 4.31 | 3.99 | 3.14 | 4.19 | 4.33 | 4.09 | 3.95 | 4.25 | 3.68 |
| CORRECTED MASS FLOW RATE (kg/s) | 6.48 | 6.62 | 6.30 | 5.45 | 6.50 | 6.64 | 6.40 | 6.26 | 6.56 | 5.99 |
| AMBIENT CAPABILITY EOL [°C] | 12 | 30 | 27 | 27 | 26 | 33 | 37 | 33 | 3 | 37 |
| AMBIENT CAPABILITY BOL [°C] | 17 | 35 | 31 | 32 | 30 | 37 | 41 | 36 | 7 | 41 |

FUEL CELL VEHICLE RADIATOR PLACEMENT AND ORIENTATION

CROSS-REFERENCE TO RELATED APPLICATIONS

This nonprovisional application claims the benefit and priority under applicable US laws or statutes to Chinese Patent Application Serial No. 202210071439.8 filed on Jan. 21, 2022, the entire disclosure of which is hereby expressly incorporated herein by reference.

TECHNICAL FIELD

The present disclosure relates to improved placement and orientation of radiators on vehicles. More specifically, the present disclosure relates to strategic placement, positioning, and/or orientation of radiators and baffles on fuel cell electric vehicles to maximize air flow and heat rejection produced by fuel cells thereof.

BACKGROUND

In recent years, with increased demand for power and efficiency from fuel cell electric vehicles (FCEVs), fuel cells used to power such vehicles have greatly increased in size. As the size of fuel cells has increased, the equipment that processes outputs of the fuel cells has correspondingly increased in size. For example, due to the large heat rejection from fuel cell engines, current models of FCEVs carry larger and/or additional equipment, e.g., more or larger radiators, to release excess engine heat to the ambient air. The larger or increased size in fuel cells and radiators has limited the amount of available space on FCEVs to carry additional equipment, cargo, and/or passengers. This space limitation has resulted in placement of equipment in areas on the vehicle in which the equipment components (e.g., radiators) do not function most efficiently.

Placement, positioning, and/or sizing of radiators in FCEVs as compared with internal combustion engines (ICEs) has several challenges. First, fuel cells (e.g., proton-exchange membrane fuel cells (PEMFCs) reject more heat to coolant in relation to power output than ICEs. Therefore, the thermal management system of a FCEV with the same fuel cell power output as an ICE vehicle must be capable of rejecting more heat to the coolant, which requires additional space for equipment.

Second, the coolant of FCEVs needs to be maintained at significantly lower temperatures compared to ICEs. Maintaining low coolant temperatures is especially challenging at high ambient temperatures. Typically, operation of fuel cells and other components of commercial vehicles is expected to occur at high temperatures, where the fuel cell performs most efficiently.

Lastly, due to the demand for high heat rejection and low coolant temperatures of the fuel cells, FCEV radiators require higher air flow compared to ICE radiators of the same size. Moreover, since power consumption of one or more fans increases exponentially with air flow, it is necessary to consider increasing the radiator core size to reduce the air flow and therefore the power consumed by the fans.

The totality of these current constraints results in larger sized radiator packs on FCEVs as compared to ICE vehicles. This complicates their packaging and positioning on the vehicle and often requires the use of space outside the vehicle engine bay. Accordingly, there is a need for improved placement, positioning, and/or orientation of radiators and/or baffles on FCEVs that enables the balanced use of available space on the FCEVs with maximized air flow through the radiators for optimal performance of the fuel cells and/or fuel cell systems.

SUMMARY

The present disclosure is directed to a vehicle radiator integration system to improve fuel cell performance. The present vehicle radiator integration system comprises a tank storage region having one or more tanks stored therein. The vehicle radiator integration system also comprises one or more radiators associated with the tank storage region. One or more baffles extending between the one or more radiators and the tank storage region. The one or more radiators and the one or more baffles are disposed above a chassis of the vehicle in an orientation that reduces hot air recirculation and air restriction for the present vehicle radiator integration system.

The orientation of the radiator is vertically parallel or is angled relative to the tank storage region. An angle of the orientation of the radiator is in a range of approximately 0 degrees to approximately 90 degrees.

The one or more baffles are disposed at a top end of the radiator, a bottom end of the radiator, or between the radiators. The orientation of the baffles is substantially perpendicular or is angled relative to the tank storage region. An angle of the orientation of the one or more baffles is in a range of approximately 15 degrees to approximately 75 degrees, such as an angle of the orientation of the one or more baffles that is approximately 45 degrees. The one or more baffles may also be disposed above the tank storage system.

The one or more radiators or the one or more baffles are located in a gap. An area of the gap may extend beyond a length or a width of the chassis of the vehicle. The gap is defined or located behind or within the tank storage region. Alternatively, the gap is defined or located between adjacent tanks within the tank storage region. In some embodiments, the radiators are disposed or located in the gap between adjacent tanks within the tank storage region without blocking one or more valves of the one or more tanks.

Further, some embodiments of the present vehicle radiator integration system comprise the radiator that does not abut the tank storage region. The radiator may be positioned in an orientation comprising an outward orientation angle or an upward orientation angle. The outward orientation angle or the upward orientation angle range from about zero degrees to about 90 degrees.

The present disclosure is also directed to an embodiment of the vehicle radiator integration system that comprises a tank storage region disposed above a chassis of the vehicle having one or more fuel tanks stored therein. The vehicle radiator integration system also comprises a gap located behind or within the tank storage region comprising one or more radiators or one or more baffles.

The one or more radiators are positioned at an orientation angle. The one or more baffles are positioned at a baffle angle. The orientation angle of the one or more radiators or the baffle angle of the one or more baffles improves air flow movement and heat ejection for the present vehicle radiator integration system.

In the present system, the orientation angle of the radiator comprises an outward orientation angle or an upward orientation angle. The outward orientation angle or the upward orientation angle range from about zero degrees to about 90 degrees. The baffle angle of the one or more baffles or the orientation angle of the one or more radiators is approximately 45 degrees.

BRIEF DESCRIPTION OF THE DRAWINGS

FIG. 1 is a schematic of a fuel cell elective vehicle (FCEV) in the art having radiators and hydrogen tanks disposed thereon;

Figure 2A:
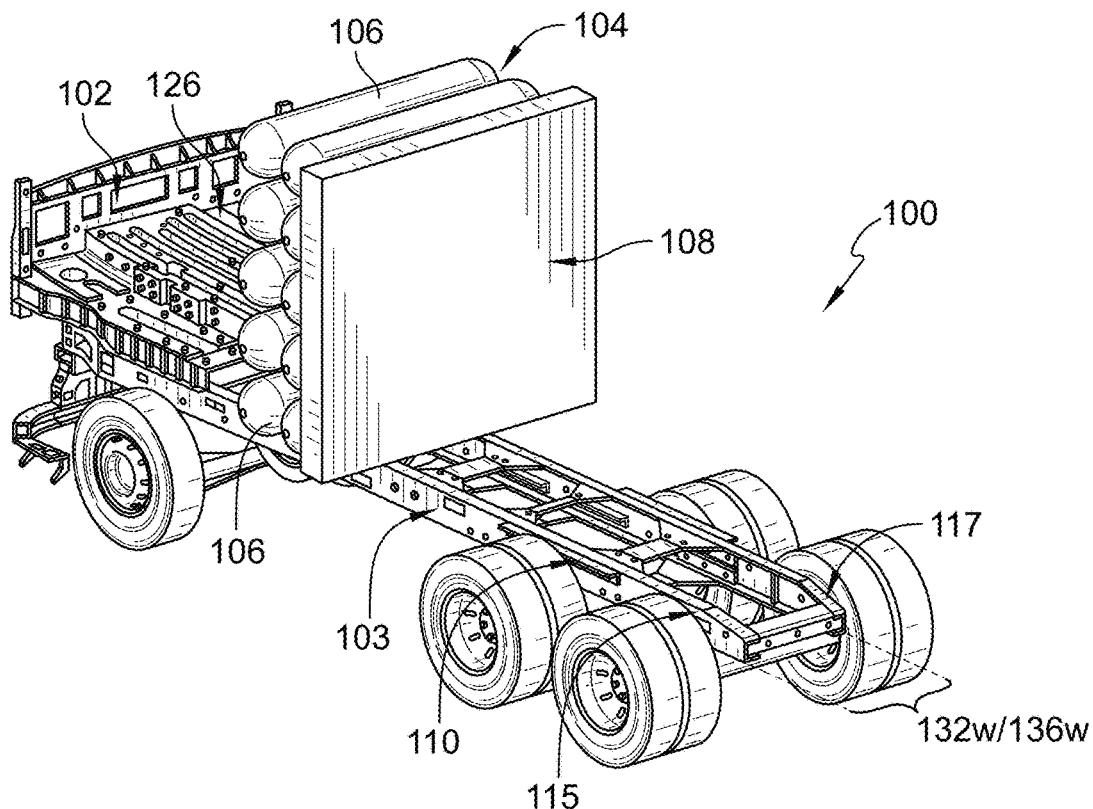
FIG. 2A is a schematic perspective view of an exemplary embodiment of a FCEV having a reduced size fuel tank storage system with increased radiator space available.

These and other features, aspects, and advantages of the present embodiments will become better understood when the following detailed description is read with reference to the accompanying drawings described herein.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims.

The features illustrated or described in connection with one exemplary embodiment may be combined with the features of other embodiments. Such modifications and variations are intended to be included within the scope of the present disclosure. Further, a person skilled in the art will recognize that terms commonly known to those skilled in the art may be used interchangeably herein.

The present disclosure is related to improved or optimized positioning, placement, and/or orientation of radiators, including radiator baffles. The present disclosure is directed to such radiator positioning, placement, and/or orientation on or upon vehicles 100. Types of vehicles 100 include, but are not limited to commercial vehicles and engines, trucks (e.g., heavy duty, mining trucks, Class 8 trucks, or box trucks), trains, trolleys, trams, planes, buses, ships, boats, and other known vehicles, as well as other machinery and/or manufacturing devices, industrial or mining equipment, installations, among others.

Exemplary embodiments of vehicles 100 of the present disclosure, include, but are not limited to hybrid or electric vehicles, HEVs, such as fuel cell electric vehicles (FCEVs) 100. Example FCEVs 100, include, but are not limited to trucks (e.g., Class 8 trucks, semitrucks, 18-wheeler trucks, mine hauling trucks, box trucks, etc.). Nonetheless, a person skilled in the art will recognize that the presently disclosed embodiments can be utilized and/or customized for all kinds of hybrid or electric vehicles (e.g., automobiles, cars, planes, buses, trains, locomotives, boats, etc.) and FCEVs 100 in order to optimize desired parameters thereof. While this disclosure discusses optimizing placement of radiators in FCEVs, it will be appreciated that the present disclosure can be applied to a variety of different types of vehicular, portable/mobile, industrial, and/or stationary applications 100.

Specifically, the present disclosure is directed to improved placement, positioning, and/or orientation of fuel cell radiators and/or radiator baffles in fuel cell electric vehicles (FCEVs) 100. The improved positioning, placement, and/or orientation of the radiators and/or baffles optimizes air flow therethrough. Increased air flow results in an increase of heat rejection capabilities of the radiator while reducing hot air recirculation and air restriction through the radiator.

FIG. 1 illustrates a current and conventional radiator layout for a fuel cell vehicle (FCEV) 10. As shown, conventional FCEVs 10 can include a chassis 12 having a fuel (e.g., hydrogen) tank storage system 14 positioned thereon, such as above or upon the chassis 12. The hydrogen tank storage system 14 can include a composite body 18, a body support structure 22, and/or a plurality of hydrogen tanks 16.

In one exemplary embodiment, the fuel tanks 16 are positioned in a one, more or a series of columns stacked upon the chassis 12 in preparation for or during operation of the vehicle 10. A conventional shape of many hydrogen tanks 16 is semicircular. It will be appreciated that the shape of any hydrogen tank 16 can vary.

The chassis 12 of the FCEV 10 can be made of a composite body 18 having sufficient strength to maintain the tanks 16 in the arrangement shown or any other desired arrangement. The composite body 18 may also comprise a body support structure 22 to maintain the fuel tanks 16 in the desired location and orientation. As shown, the body support structure 22 may comprise a vertical orientation to secure the fuel tanks 16 in the desired location and orientation (e.g. one or more columns) particularly during transit.

The conventional FCEV 10 includes available space for radiators 20 at the front and/or on one or both sides of the chassis 12, as shown. The available space to accommodate or position radiators 20 on FCEVs is limited since conventional trucks have only approximately 2.1 meters ($m^2$) of space at the front and/or on one or more sides. This amount of space for radiators can be insufficient for larger vehicles, such as trucks. Trucks and other large vehicles tend to utilize larger fuel cells that have high heat rejection requirements, with the conventional space remaining on the FCEV 10 being insufficient to store radiators 20 of the size needed to eliminate the excess heat produced by these larger fuel cells.

Optimal placement of radiators 20 can vary based on the type of vehicle 10. For example, a vehicle 100 of the present disclosure may include any component, compartment, brand, and/or type of vehicle 100. The present vehicle or FCEV 10 components may include, but are not limited to one or more vehicle cabins, vehicle powertrains, vehicle control systems, vehicle thermal management and/or cooling systems, etc.

Figure 2B:
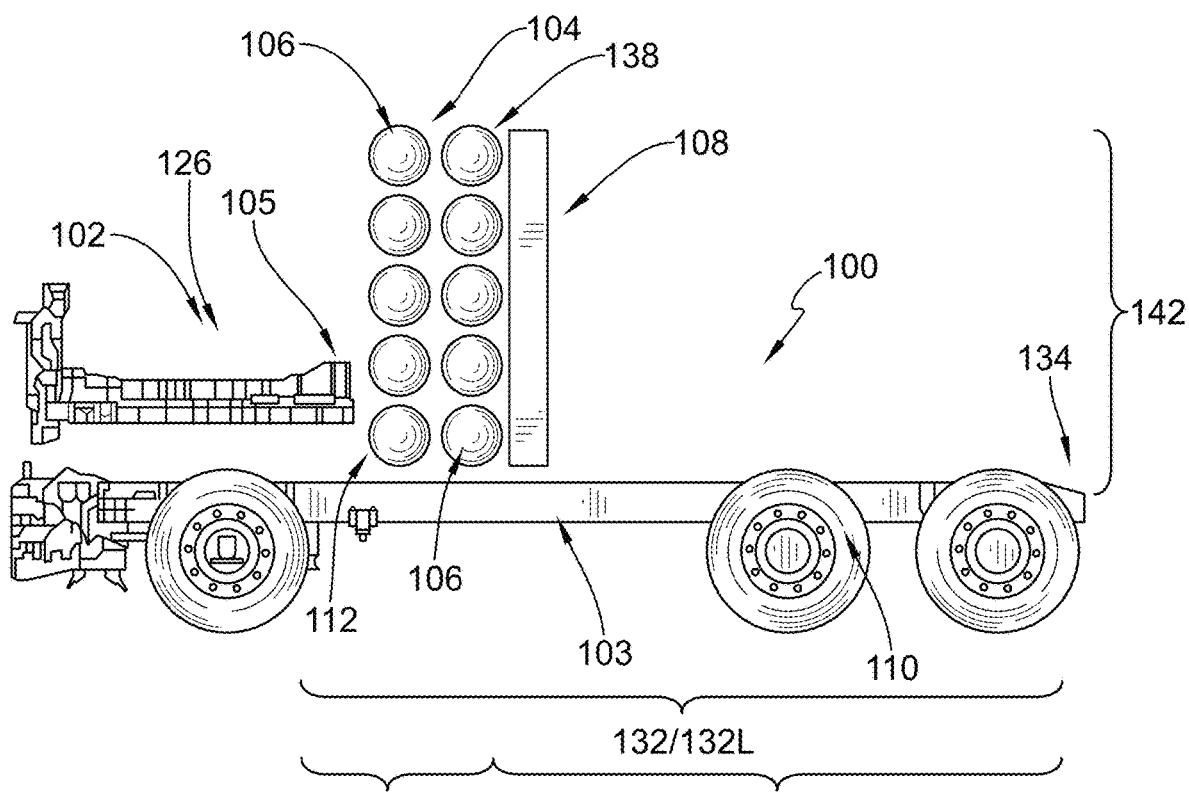
FIG. 2B is a side view of the FCEV of FIG. 2A.

Referring now to FIGS. 2A and 2B, vehicles and FCEVs 100 of the present disclosure (e.g., Class 8 trucks) can include a tank storage system or region 104. The tank storage system 104 may house one or more fuel (e.g., hydrogen) tanks 106 that are stored therein. In some embodiments, the tank storage system 104 can be located behind a cabin 102 of the FCEV 100 such that the hydrogen tanks 106 abut a back face or wall 105 of the cabin 102. Unlike conventional FCEVs 10, Class 8 trucks and other FCEVs 100 of the present disclosure have fuel cells 126 within, above, below, around, near, abut, or in close proximity to or with the cabin 102, 202 that produce power, such as power to fuel the vehicle 100.

Fuel cells or fuel cell systems 126 comprised by the present FCEV 100 include but are not limited to solid oxide fuel cells (SOFCs) 126. Other common types of fuel cells 126 comprised by an FCEV 100 of the present disclosure include phosphoric acid fuel cells (PAFCs) 126, molten carbonate fuel cells (MCFCs) 126, and/or proton exchange membrane fuel cells (PEMFCs) 126, all generally named after their respective electrolytes. Many of these types of fuel cells and systems 126 are useful for powering smaller portable applications, such as cars, trucks, industrial equipment, and/or other types of vehicles, such as the present FCEV 100, or powertrain(s) comprised therein. An exemplary fuel cell or fuel cell system 126 of the present FCEV 100 is a PEMFC 126.

Amounts of power produced by a fuel cell or fuel cell system 126 is determined by and/or based on the vehicle (e.g., FCEV) 100 power demand and the power capacity of a battery (e.g., a traction battery). Power produced by typical fuel cells 126 ranges from at, about, approximately, or greater than 100 kW. For example, some fuel cells 126 may produce power ranging from about 100 kW to approximately 500 kW, including any specific power amount or range of power comprised therein.

In addition, fuel cell 126 engine power for a vehicle 100, such as a tractor, may range from about 100 kW to about 300 kW, including any specific power amount or range of power comprised therein. Larger power outputs by a fuel cell 126 may also be required, for example, if the fuel cell 126 is coupled with a battery that has small power capacity. Such large amounts of power generated by the FCEVs 100 require significant heat rejection capacity for optimal operation and performance of the fuel cells 126.

One or more radiators 120 can be disposed on, upon, or atop of the vehicle or FCEV 100 to facilitate elimination of excess heat. Radiators 120 in Class 8 trucks 100, for example, cannot be placed in front of the cabin 102 of the truck as these radiators 120 would not experience sufficient air flow to remove the excess heat generated by the fuel cells 126 thereof. Therefore, one or more radiators 120 and/or baffles 124 of the present vehicle 100 are typically positioned, placed, or located behind the cabin 102 of the truck 100 and/or atop a chassis 103 of the vehicle 100 (see FIGS. 2A and 2B).

Figure 5:
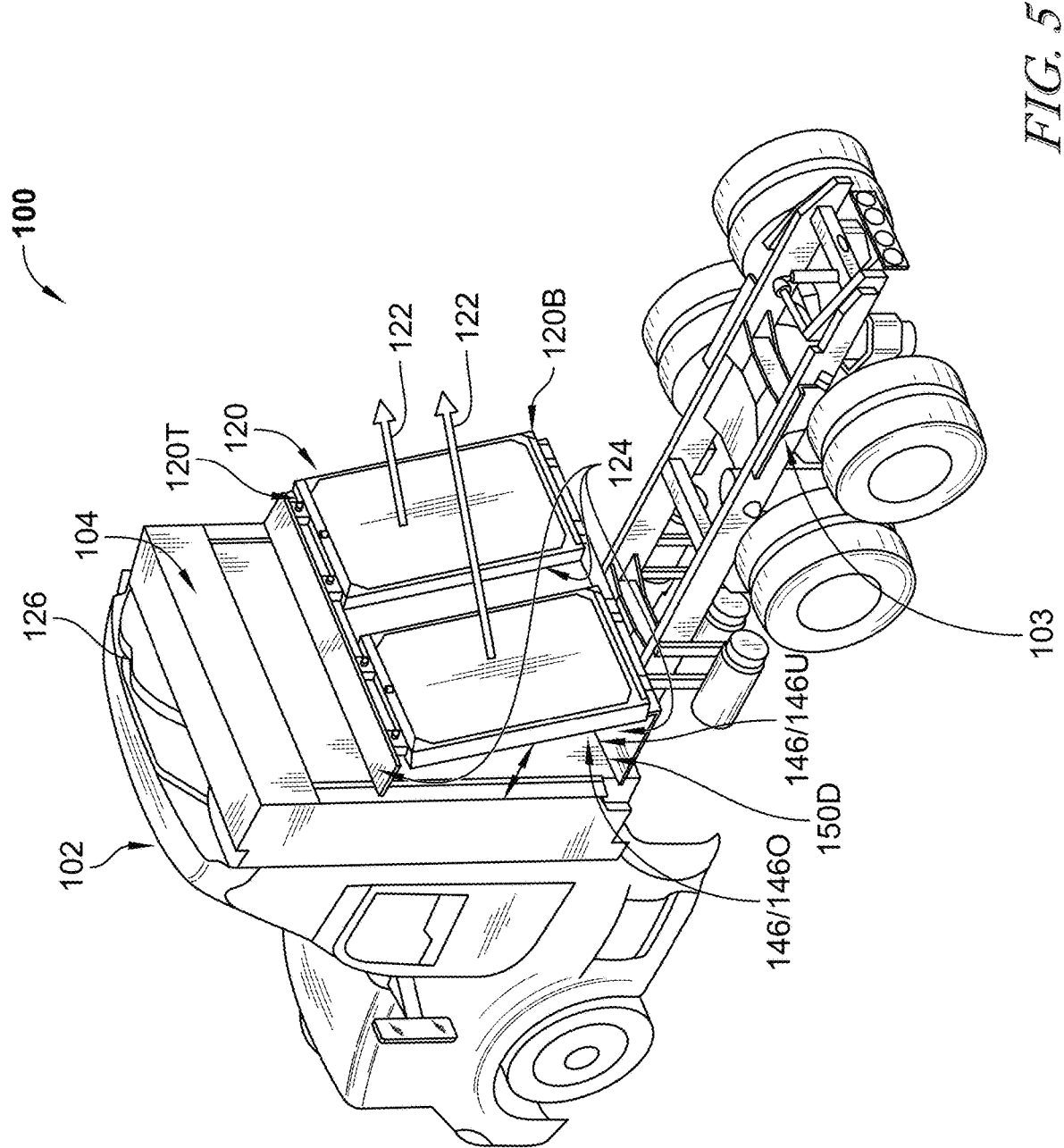
FIG. 5 is a schematic perspective view of an exemplary embodiment of an FCEV (e.g., a Class 8 truck) having optimized placement and positioning of a radiator and baffles.

In exemplary embodiments, the one or more radiators 120 and/or baffles 124 are positioned or placed in a particular orientation, such as an orientation angle 146 or a baffle angle 228, respectively. As shown in FIG. 5, the orientation angle 146 of the radiator 120 is typically located behind the cabin of the truck 100 and/or atop the chassis 103. In some embodiments, the radiators 120 are in direct contact or substantially coupled or connected to the cabin 102. In other embodiments, the radiators 120 are not in direct contact or coupled to the cabin 102 of the truck 100. For example, a gap or a region of available space 108 ("a gap") can be formed above the chassis 103, such as between the cabin 102 and the radiators 120.

Referring to FIGS. 2A and 2B, the gap 108 may be disposed within the fuel tank storage system 104 or can extend along an area 132 (i.e., a length (L)×width (W)) on the chassis 103 of the vehicle 100. The length (L) 132l of the area (A) 132 of the gap 108 along the chassis 103 may be measured from the back wall or face 105 of the cabin 102 to the back end 134 of the vehicle 100. The width (W) 132w of the area (A) 132 of the gap 108 on the chassis 103 can be measured from a first side rail 115 to a second side rail 117 of the chassis 103. The product of the length (L) 132l times the width (W) 132w defines the area (A) 132 comprised by the chassis 103.

The length (L) 136l of the area (A) 136 of the gap 108 along the chassis 103 comprising the fuel tank storage system 104 may be measured from the back wall or face 105 of the cabin 102 to the back end 138 of the fuel tank storage system 104. The width (W) 136w of the area (A) 136 of the gap 108 on the chassis 103 is the same as 132w and can be measured from a first side rail 115 to a second side rail 117 of the chassis 103. The product of the length (L) 136l times the width (W) 136w defines the area (A) 136 comprised by the fuel tank storage system 104.

Radiators 120 may utilize or occupy a space or an area 140 within the gap 108 that equals the area (A) 132 along the chassis 103 minus the area (B) 136 occupied by the fuel tank storage system 104, including the fuel tanks 106, and any additional components comprised therein. Specifically, any amount of the area 140 of the gap 108 on the chassis 103 may be configured to hold or store radiators 120 and/or baffles 124 thereon. In some embodiments, the area 140 of the gap 108 is not confined or constrained by the foundational area or support provided by the vehicle 100 or chassis 103.

Figure 3:
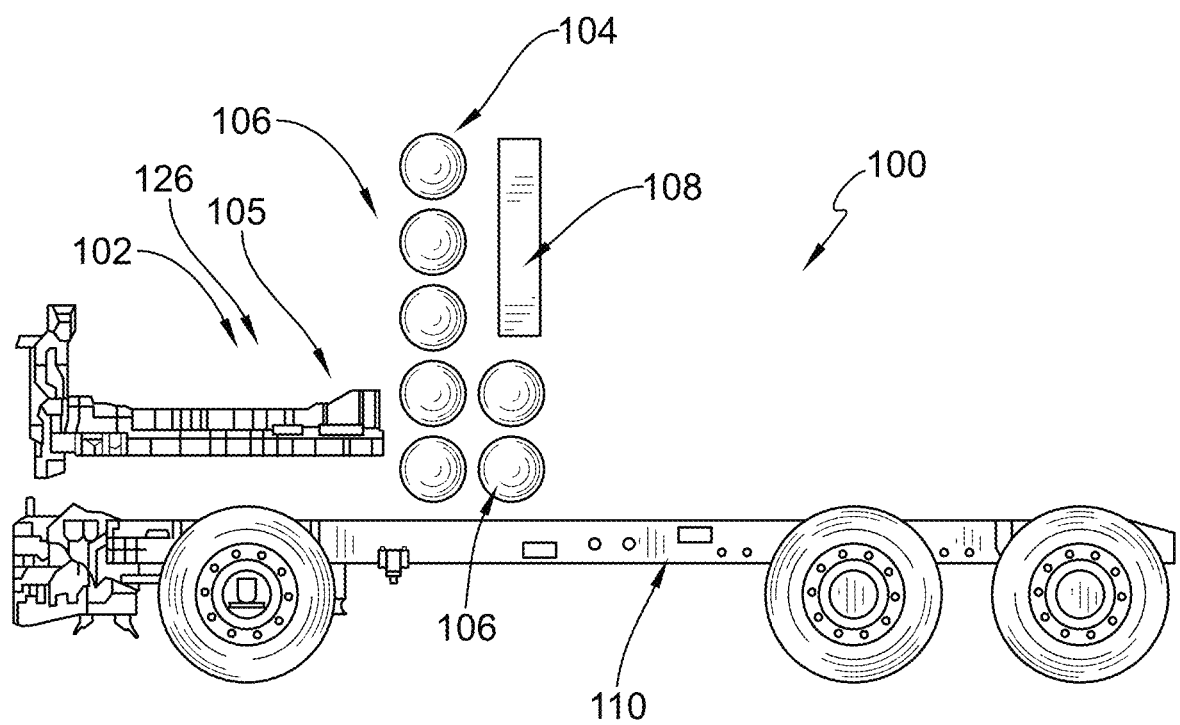
FIG. 3 is a schematic perspective view of another exemplary embodiment of a FCEV having radiator storage located within the fuel tank storage system.

Notably, in some embodiments, the area 140 of the gap 108 can extend beyond a width of the chassis 103, such that objects disposed in the gap 108 are wider than the width 132w of the area (A) 132. Similarly, in some embodiments, the area 140 of the gap 108 can extend beyond a length of the chassis 103, such that objects disposed in the gap 108 are longer than the length 132l of the area (A) 132. Nonlimiting embodiments of the dimensions of the gap 108 area 140 are shown in FIGS. 2A-3.

The area 140 of the gap 108 may comprise a length (X), width (Y), and depth (Z) of any size. In exemplary embodiments shown in FIGS. 2A-3, the length (X) of the area 140 of the gap 108 may range from about 100 mm to about 600 mm, including any specific length or range of length comprised therein (e.g., about 200 mm to about 500 mm). The width (Y) of the area 140 of the gap 108 may range from about 100 mm to about 2550 mm, including any specific width or range of widths comprised. In these specific embodiments, the depth (Z) of the area 140 of the gap 108 may range from about 300 mm to about 3000 mm, including any specific depth or range of depths comprised therein.

In these same embodiments, the maximum plane area (A) 140 of the gap 108 may range from about 1 $m^2$ to about 10 $m^2$, including any specific area or range of areas comprised therein. In specific embodiments, the maximum plane area 140 of the gap 108 is at or about 7.65 $m^2$. In addition, the maximum volume of the area (A) 140 of the gap 108 may range from about 0.5 $m^3$ to about 10 $m^3$, including any specific volume or range of volumes comprised therein. In specific embodiments, the volume of the area 140 of the gap 108 is at or about 3.825 m³.

The chassis 103 of the vehicle 100 can balance and/or support objects placed thereon (e.g., within the area 140 and/or gap 108). Such objects or components can be secured to the chassis 103 by any securing mechanism. For example, a securing mechanism of the present disclosure may comprise a rope, a zip tie, a clamp, a clasp, and any such securing mechanism known in the art to prevent the objects from dislodging from the chassis 103, particularly during transport.

In some embodiments, the area 140 of the gap 108 may comprise a support structure 118 to house the radiators 120 and/or baffles 124. In other embodiments, the area 140 of the gap 108 does not comprise any support structure 118 to house or contain one or more radiators 120 and/or baffles 124 (see FIG. 5 for location of the baffles 124).

For example, as shown in FIGS. 2A and 2B, the gap 108 can be formed between the storage system 104 and a trailer or payload 110 transported by the cabin 102 to allow for sufficient space for trailer mounting and account for trailer turn radius. Placement of radiators 120 in this gap 108 can also allow for packaging bigger radiator cores with fans (e.g., high efficiency and/or electric fans) as an additional or supplemental component of the present radiators 120. Therefore, this gap 108 is sufficiently sized to accommodate the placement of one, more, or a plurality of radiators 120 and any supplemental radiator components, as the area 140 of the gap 108 tends to be larger than the space on the sides of the chassis 12 that houses the radiators 20 of conventional vehicles 10, as described above (e.g., about 2.1 m²).

In some embodiments, the area 140 of the gap 108 can be increased by reducing a size of the hydrogen tanks 106 and/or the area 136 comprised by the fuel tank storage system 140. For example, as shown in FIGS. 2A and 2B, a size of the hydrogen tanks 106 and/or the area 136 comprised by the fuel tank storage system 140 can be reduced to provide additional available space 108 to house radiators 120 (with or without supplemental fans). As shown, the tanks 106 in the tank storage system 104 are reduced in width to allow for maximization of the available area 136 in the space 108 for additional radiator 120 storage.

In some embodiments, reducing the size of the tanks 106 can decrease the area 136 and increase the area 140 of the gap 108 by around, at, or greater than 6.5 meters². Once an area 140 of the gap 108 is defined, in some embodiments, radiators 120 can be stacked within the gap 108 to a height (H) 142. The height (H) 142 of a stack 112 of hydrogen tanks 106 and/or the fuel tank storage system 140 atop the vehicle 100, as shown, may be any height (H) 142. In exemplary embodiments, the height (H) 142 of a stack 112 of fuel tanks 106 is any height that is legally transportable on a vehicle 100 according to local and national laws and regulations.

In some aspects, the available space or gap 108 can be further maximized by removing one or more of the hydrogen tanks 106 from the tank storage system 104. As shown in FIG. 3, one or more tanks 106 can be removed from the tank storage system 104 to allow one or more radiators 120 to be placed in a gap 108 therein. While three tanks 106 are shown removed from the tank storage system 104 of FIG. 3, it will be appreciated that in some embodiments, two or fewer tanks 106 can be removed. In other embodiments, four or more tanks 106 can be removed.

A person skilled in the art will recognize that the amount of tanks 106 that can be removed from the fuel tank storage system 104 is limited only by a minimum number of tanks 106 that are needed for the vehicle 100 to function properly. Moreover, it will be appreciated that using a portion of the tank 106 storage space of the tank storage system 104 for radiator 120 placement can be done in vehicles 100 that do not require substantial amounts of heat rejection, e.g., vehicles with smaller fuel cells 126. In contrast, vehicles with large or large amounts of fuel cells 126 reject large amounts of heat (e.g., about 100 kW), which typically cannot be adequately handled simply by radiators 120 being placed within the tank storage system 104 due to insufficient air flow therethrough, as discussed in greater detail below.

Once the size of the gap 108 is established, an optimal orientation of the radiator 120 within the gap 108 can be ascertained. While the available space 108 in FIGS. 2A, 2B, and 3 is shown as being substantially parallel to the stacks 112 of tanks 106, radiators 120 in this straight vertical orientation may not be optimized for efficiency. For example, during motion of the vehicle or truck 100, air can become trapped between the hydrogen tanks 106 or storage system 104 and the truck trailer 110 or cabin 102. This inhibition of air flow causes undesired hot air recirculation and air restriction that can be damaging to the performance of the radiators 120 as well as the fuel cells 126. As a result, radiators 120 can be placed in a variety of positions in this gap 108 to counteract hot air recirculation, air restriction, and optimize or enhance a number of additional parameters for maximal air flow, hear ejection, and fuel cell 126 performance.

Figure 4:
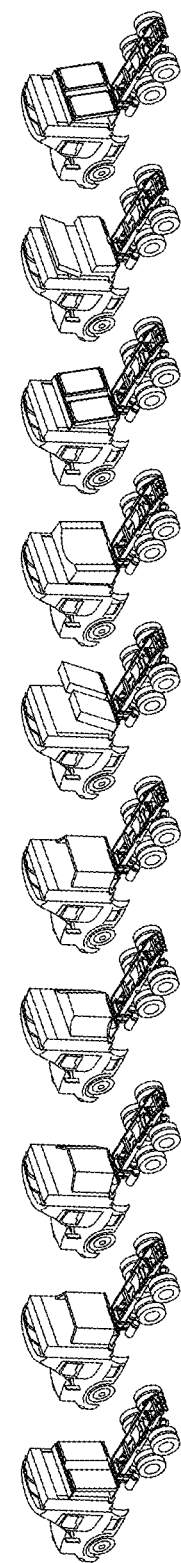
FIG. 4 is a table illustrating parameter values for various configurations of a radiator on the FCEV.

FIG. 4 comprises a table that demonstrates several vehicle prototypes ("concepts") having specific radiator 120 and/or baffle 124 placement, positioning, and/or orientation within the gap 108, along with experimental data values for parameters estimated, assessed, measured, and/or optimized for efficient fuel cell 126 performance. As shown in the table of FIG. 4, the measured parameters that were assessed can include, but are not limited to coolant inlet temperature, rise over ambient air, air mass flow rate, corrected mass flow rate, ambient capability end-of-life (EOL), and/or ambient capability beginning-of-life (BOL), among others.

These parameters were measured at ten different angular orientations of the radiator 120 and/or baffles 124 within the gap 108 on a vehicle 100. The baseline orientation shown in FIG. 4 included the radiator 120 and/or baffles 124 being placed vertically and substantially parallel to the tanks. Alternatively, concepts 1-7 positioned the radiators 120 and/or baffles 124 at various angles and orientations within the gap 108. In addition to their placement and positioning (e.g., location) on the vehicle 100 or chassis 130, the radiator 120 and/or baffles 124 were also oriented at a particular angle on the vehicle 100, within or outside of the gap 108 above the chassis 103. Specifically, the radiators 120 were positioned at a particular orientation angle, while the baffles 124 were placed at a particular baffle angle 228.

While the orientation angle 146 of the radiator 120 can vary, optimal effects on reduction of hot air recirculation and air restriction have been observed when the orientation angle 146 of the radiator 120 is positioned at an upward incline. The orientation angle 146 may be in a range of approximately 0 degrees to approximately 95 degrees, including any specific or range of angles comprised therein. In some embodiments, the orientation angle 146 is not greater than 45 degrees. In some embodiments, the orientation angle 146 is not greater than 90 degrees.

For example, in some exemplary embodiments, the orientation angle 146 is in a range of approximately 0 degrees to about 90 degrees, approximately 2 degrees to about 90 degrees, 0 degrees to approximately 35 degrees, 0 degrees to approximately 25 degrees, 0 degrees to approximately 15 degrees, 0 degrees to approximately 5 degrees, in a range of approximately 5 degrees to approximately 25 degrees, in a range of approximately 5 degrees to approximately 90 degrees, in a range of approximately 15 degrees to approximately 90 degrees, in a range of approximately 25 degrees to approximately 90 degrees, in a range of approximately 10 degrees to approximately 20 degrees, or an angle of approximately 15 degrees, approximately 2 degrees to about 45 degrees, 0 degrees to approximately 35 degrees, 0 degrees to approximately 25 degrees, 0 degrees to approximately 15 degrees, 0 degrees to approximately 5 degrees, in a range of approximately 5 degrees to approximately 25 degrees, in a range of approximately 5 degrees to approximately 45 degrees, in a range of approximately 15 degrees to approximately 45 degrees, in a range of approximately 25 degrees to approximately 45 degrees, in a range of approximately 10 degrees to approximately 20 degrees, or an angle of approximately 15 degrees, including any specific or range of angles comprised in each of the ranges described therein (see FIG. 5).

For example, the orientation angle 146 of the radiators 120 may comprise an outward angle 146o and/or an upward angle 146u. In some embodiments, the orientation angle 146 is the sum of the outward orientation angle 146o and the upward orientation angle 146u. In other embodiments, the outward orientation angle 146o and the upward orientation angle 146u may be located or positioned separately, but work together to properly place the radiator 120 in the proper orientation on the vehicle 100 in order to provide the most efficient air flow and maximize fuel cell 126 and radiator 120 performance.

The outward orientation angle 146o may define an angle and/or a distance that the radiator 120 is positioned away from the back wall or face of the cabin 105 and/or the tank storage system 104 of the vehicle. The outward orientation angle 146o of the radiator may range from about zero degrees (0°) to about 90 degrees, including any specific or range of angle comprised therein (see prototype/concept 1, 2, and 4 of FIG. 4).

For example, in some embodiments, the outward orientation angle 146o will be about zero degrees (0°), such that the outward orientation angle 146o lies parallel to the back wall or face of the cabin 105. In other embodiments, the outward orientation angle 146o will be about 90 degrees (90°), such that the outward orientation angle 146o lies perpendicular to the back wall or face of the cabin 105. In further embodiments, the outward orientation angle 146o will be about 45 degrees (45°), such that the outward orientation angle 146o lies is a slanted position toward the back wall or face of the cabin 105.

The upward orientation angle 146u of the radiator 120 may be angled in an upward orientation with the chassis 103 of the vehicle 100. The upward orientation angle 146u of the radiator 120 may also be angled in a downward incline with the chassis 103 of the vehicle 100. The upward or downward angle 146u may range from about zero degrees (0°) to about 90 degrees (90°), including any specific or range of angle comprised therein (see prototype/concept 3, 5, 6, and 7 of FIG. 4).

For example, in some embodiments, the upward orientation angle 146u will be about zero degrees (0°). In other embodiments, the upward orientation angle 146u will be about 90 degrees (90°). In further embodiments, the upward orientation angle 146u will be about 45 degrees (45°). In an exemplary embodiment, the upward orientation angle 146u range from about 5 degrees to about 25 degrees including any specific or range of angle comprised therein.

Values of the parameters assessed in FIG. 4 were compared to determine optimal orientation of the radiator 120 and baffles 124 for efficient fuel cell 126 performance. In some embodiments, higher ambient capability values and lower values for parameters, such as rise over ambient air were suggestive of optimal radiator 120 orientation. Accordingly, vehicle 100 concepts or prototypes observed to have low rise parameters over ambient and high ambient capabilities were determined to have optimal fuel cell 126 performance. In some such embodiments, the prototypes or concepts were compared on the basis of ambient capability BOL, with a target ambient capability value of 40 degrees Celsius or higher being preferred.

After testing each of the concepts or prototypes, concepts #4 and #7 were determined to provide the best performance associated with the orientation of the radiator 120. For example, both concepts #4 and #7 had the highest values of ambient capability BOL, e.g., 41 degrees Celsius, as shown. Concept #7 was ultimately deemed to be the preferred concept due to its easier mechanical integration and relative ease of manufacturing as compared to concept #4.

Moreover, concept #7 is seemingly safer than concept #4, which allows hot surfaces to be exposed. In some aspects, concept #7 also has a lower risk of trailer movement as compared to concept #4, with concept #4 having a higher possibility of trailer interference with a curved wall when making a 90-degree turn. Concept #7 can also be preferred to concept #4 due to higher sociability with neighboring vehicles, with concept #4 having the possibility of hot air being exhausted onto side lanes therefrom that can enter other vehicles on the road.

FIG. 5 illustrates the orientation of the radiator 120 and baffles 124 in concept #7 of FIG. 4 in more detail. As shown, the radiator 120 can include a plurality of coolpacks 122 configured to remove heat to the ambient environment. While two coolpacks 122 are shown, it will be appreciated that in some embodiments the radiator 120 can include a single coolpack 122 or three or more coolpacks 122.

Moreover, in some embodiments, the one or more radiators 120 do not abut the tank storage system 104. For example, as shown in FIG. 5, a one, more, a few, or a plurality of baffles 124 can be configured to adjoin or connect to or with the one or more radiators 120. Baffles 124 may be located, connected to, and/or configured to adjoin one or more sides of the one or more radiators 120 together or to other components.

In some embodiments, a baffle 124 can be placed between individual coolpacks 122 of the radiator 120 to create a space therebetween, as shown in FIG. 5. In other embodiments, the baffles 124 may contact, connect, or adjoin the radiator 120 with the hydrogen tank storage system 104. In some embodiments, the radiator 120 is disposed at a distance 150D from a tank 106 or the tank storage system 104. The baffles 124 can then be positioned at a top end 120t and at a bottom end 120b of the radiator 120 to space the radiator 120 from the tank storage system 104 or the cabin 102 at the distance 150D.

Positioning of the baffles in the above-mentioned locations can have positive impacts on the necessary elimination of excess heat. For example, the baffles 124 at the top end 120t and/or between the coolpacks 122 can reduce hot air recirculation. In some aspects, the baffle 124 at the bottom end 120b can prevent hot air exhausted from an engine bay radiator (not shown) from entering into the radiator 120.

In some embodiments, the baffle 124 can be comprised of a solid plate having substantially no permeability so as to substantially prevent air or material flow through the baffle 124 material. Some non-limiting examples of baffle 124 materials can include metals, such as aluminum, iron, steel, sheet metal, ceramic, and plastic, among others. In other embodiments, the baffle 124 can be comprised of a material having porosity and/or permeability so as to allow or enable air or material flow through the baffle 124 material. In addition to the heat ejection functions described herein, baffles 124 may also be structurally used in any system or method to mount additional system components (e.g., coolants, tanks, wiring, electronics, controls, etc.).

In some embodiments, the radiators 120 of the present vehicle 100 or fuel cell system 126 have capacity to generate power that is about 1 to about 1.5 times the power of the fuel cell 126 power engine comprised therein. For example, a vehicle 100 that has a fuel cell engine 126 that produces 180 kW of power will typically require a radiator 120 having a power capacity ranging from about 180 kW to about 270 kW, including any specific power output or range of power comprised therein. In some embodiments of vehicles 100, such as Class 8 trucks 100 of the present embodiments, the fuel cell 126 can also generate approximately 180 kW of power, which increases the demand for heat rejection.

Figure 6:
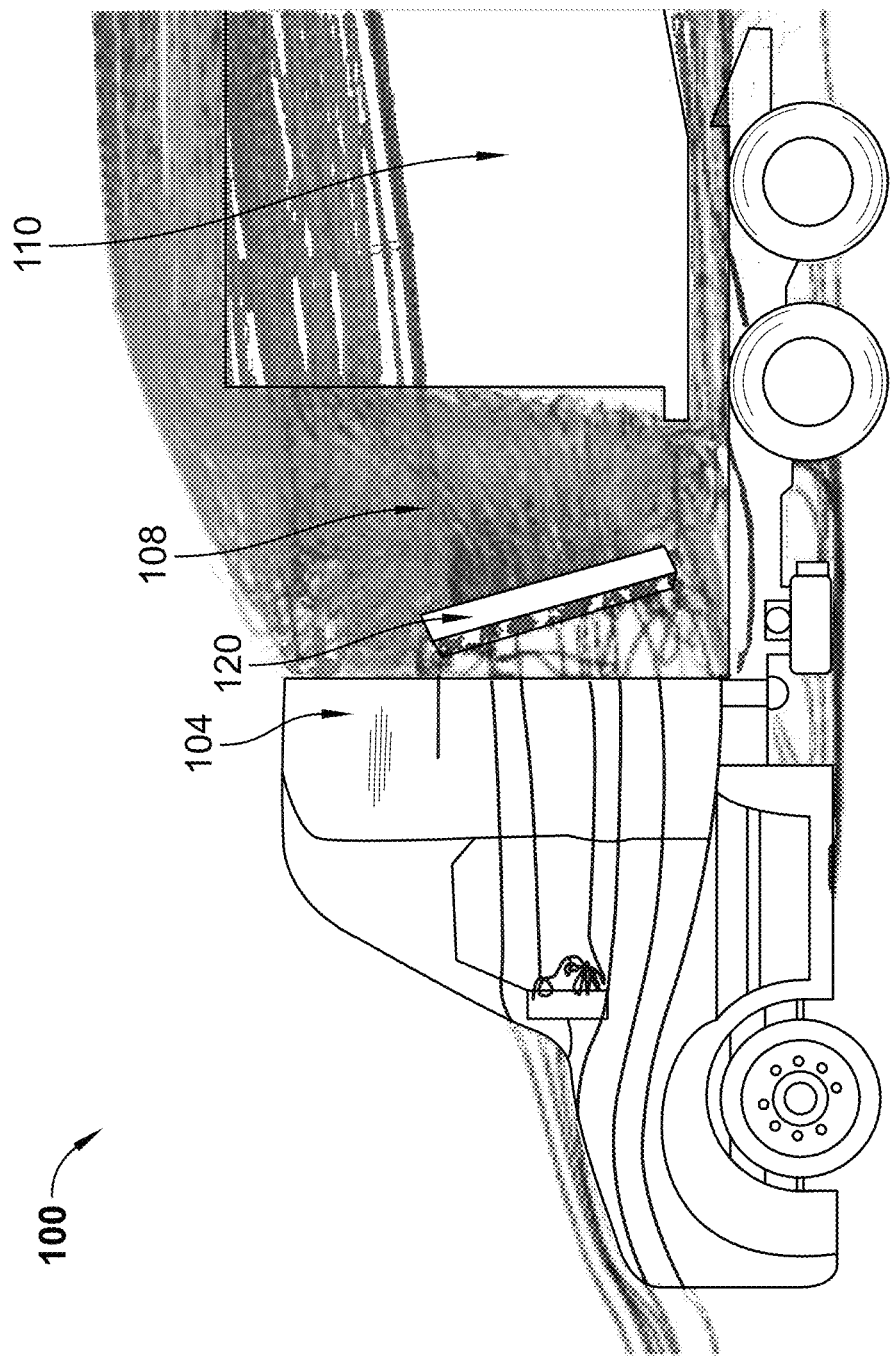
FIG. 6 is a schematic side view of the air flow through the radiator of the FCEV of FIG. 5.

Some available space 108 is left unoccupied in present configurations in which the radiator 120 is angled, as shown in FIGS. 5 and 6. For example, the orientation of the radiator 120 being spaced apart from the tank storage system 104 and having an orientation angle 146 that is inclined upward provides optimal logistic capacity to maximize the placement, positioning, and location of the radiator(s) 120 in order to maximize its performance. Performance of the radiator 120, baffles 124, and/or fuel cell 126 may be evaluated, measured, and/or estimated according to parameters and metrics shown in FIG. 4.

Moreover, this angled orientation of the radiator 120 and baffles 124 reduces recirculation of hot air and air restriction. As shown in FIG. 6, air that enters the radiator 120 from the fuel cell 126 can exit the radiator 120 unimpeded substantially without recirculation providing maximum cooling effect and increasing fuel cell 126 performance. Notably, the air that exits the radiator 120 into the gap 108 can flow over the top of the trailer 110 of the vehicle 100 and out of the gap 108 enabling efficient heat rejection.

Referring back to FIG. 5, one or more of the plurality of baffles 124 can extend at various baffle orientation angles from the tank storage system. For example, as shown, the top end 120t of the radiator 120 can abut a baffle 124 that extends substantially perpendicular to the tank storage system 104. Moreover, the bottom end 120b of the radiator 120 can abut a second baffle 124 that extends substantially perpendicular to the tank storage system 104. In some illustrated aspects, the second baffle 124 can extend farther out from the tank storage system 104 to cause the radiator 120 to incline upward.

Aiding in the upward incline of the radiators, is the baffle thickness. Baffles 124 can have a thickness that ranges from about 2 mm to about 100 mm, including any specific thickness or range of thicknesses comprised therein. However, the functional utility of the baffles (e.g., whether they are structurally supporting additional components) also helps determine the requisite thickness of the baffles to maximize and/or optimize radiator 120 and/or fuel cell 126 performance. Exemplary thicknesses of the baffles 124 may comprise a range of about 5 mm to about 50 mm, including any specific thickness or range of thicknesses comprised therein.

Figure 7B:
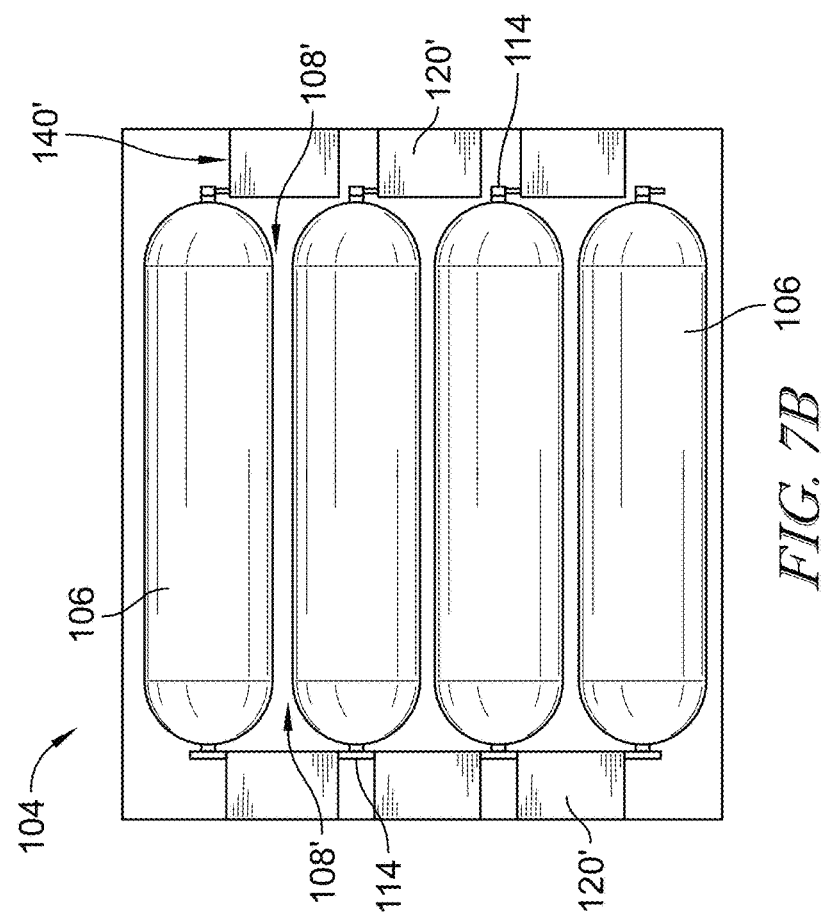
FIG. 7B is a side view of the FCEV fuel tank storage system of FIG. 7A.
Figure 7A:
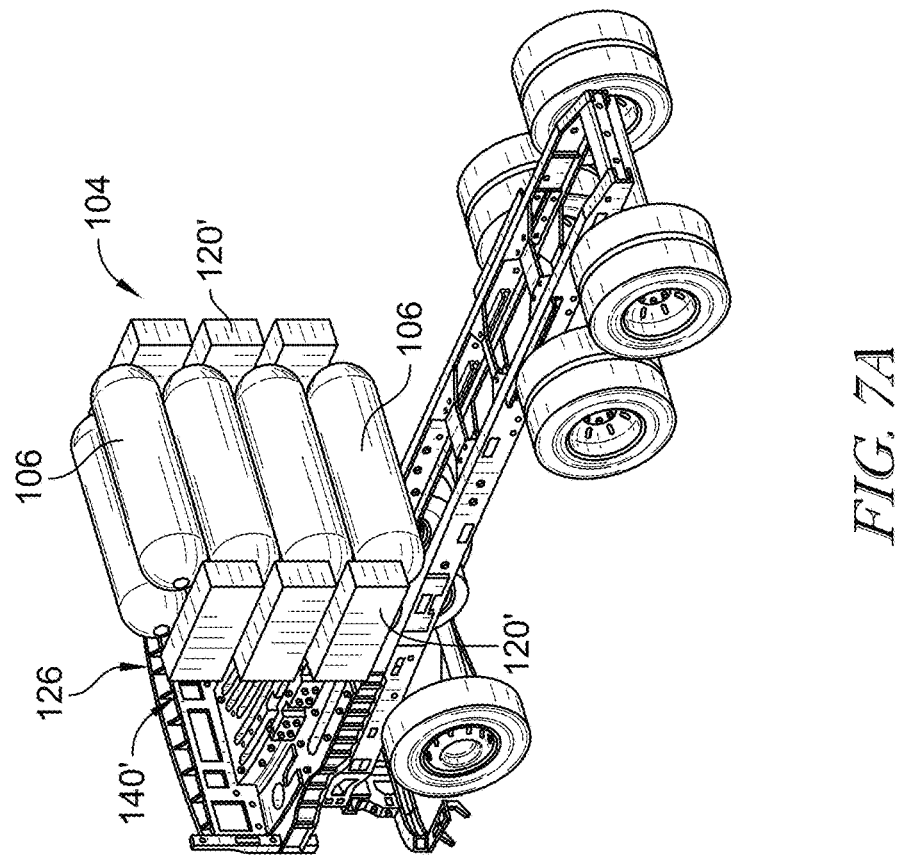
FIG. 7A is a schematic perspective view of another exemplary embodiment of a FCEV having radiators disposed between hydrogen tanks of a fuel tank storage system.

With larger radiators 120, there may be insufficient space 108 to place any radiators 120 on the side of the chassis 12 as in the conventional vehicles 10 discussed with respect to FIG. 1. Instead, in some present embodiments (see FIGS. 7A and 7B), the radiators 120' can be placed in gaps 108' formed between the hydrogen tanks 106 in the fuel tank storage system 104 to maximize available space 108' on the vehicle 100 without changing a size of the tanks 106 or the tank storage system 104. FIGS. 7A-7B, illustrate a plurality of radiators 120' being positioned on both sides of the hydrogen tanks 106 to fit within gaps 108' between respective tanks 106 of the tank storage system 104.

As shown, the radiators 120' can be disposed between valves 114 of adjacent tanks 106 to hold the radiators 120' in place without changing a size and/or shape of the tanks 106. A person skilled in the art will appreciate that the tanks 106 are arranged between the valves 114 so as not to block any piping that enters and exits the valves 114 located on the ends of the hydrogen tanks 106. The gap 108' formed between the tanks 106 does not affect air flow through the valves 114 travelling to and from the radiators 120'.

As shown, every gap 108' between adjacent tanks can be filled. In specific embodiments, such as shown in FIGS. 7A and 7B, the available space for tanks 106 in the tank storage system 104 is configured in levels, such as 1, 2, 3, 4, 5, 6, or more levels. For example, if the tanks 106 are stacked in four levels, as shown, three radiators 120' can be disposed in the gaps 108' on both sides of the tanks 106, for a total of six radiators 120'.

It will be appreciated that the number of radiators 120' disposed between the tanks 106 can vary based on the number of rows or levels of tanks 106. The number of rows or levels of tanks 106 also determines the amount of available space 108' in which to dispose radiators 120'. Importantly, this arrangement or embodiment of the radiators 120' in the gaps 108', as shown in FIGS. 7A and 7B, can result in a maximum radiator frontal area that is approximately greater than 2.7 meters$^2$, and is over 20% larger than the available space of conventional arrangements as discussed above (2.1 meters$^2$) in FIG. 1.

Specifically, the area 140' of the gap 108' may comprise a length (X), width (Y), and depth (Z) of any size. In exemplary embodiments shown in FIGS. 7A and 7B, the length (X) of the area 140' of the gap 108' may range from about 200 mm to about 700 mm, including any specific length or range of length comprised therein (e.g., about 200-600 mm). The width (Y) of the area 140' of the gap 108' may range from about 100 mm to about 550 mm, including any specific width or range of widths comprised therein (e.g., about 200-400 mm). In these specific embodiments, the depth (Z) of the area 140' of the gap 108' may range from about 50 mm to about 1000 mm, including any specific depth or range of depths comprised therein (e.g., about 100-700 mm).

In these same embodiments, the maximum plane area (A) 140' of the gap 108' may range from about 0.1 m$^2$ to about 2 m$^2$, including any specific area or range of area comprised therein. In specific embodiments, the maximum plane area 140' of the gap 108' is at or about 0.42 m$^2$. In addition, the maximum volume of the area (A) 140' of the gap 108' may range from about 0.1 m$^3$ to about 1 m$^3$, including any specific volume or range of volumes comprised therein. In specific embodiments, the volume of the area 140' of the gap 108' is at or about 0.21 m$^3$.

Figure 8:
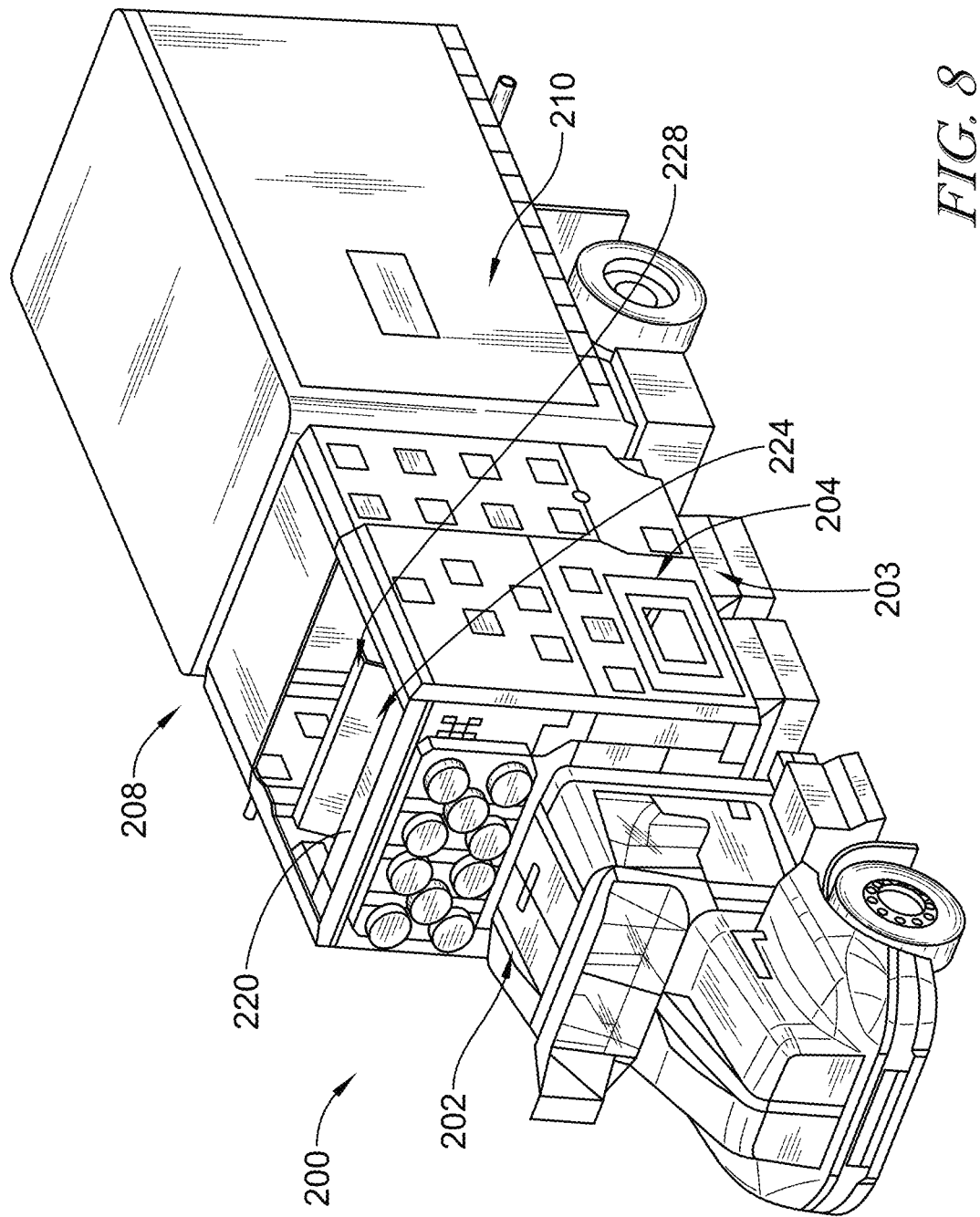
FIG. 8 is a schematic perspective view of a second exemplary embodiment of a FCEV (e.g., a box truck) having optimized placement and positioning of a radiator and baffles.

FIG. 8 illustrates an embodiment of optimized radiator placement on a box truck 200. Box trucks 200 differ from Class 8 trucks 100 embodiments in that the available space or gap 208 between the tank storage system 204 and the trailer or payload 210 is smaller on box trucks 200 than Class 8 trucks 100. In fact, the available space or gap 208 on box trucks 200 may not be sufficient to dispose a radiator 220 therein. While existing space 208 may be optimized for radiator placement in Class 8 trucks 100, in some aspects of box trucks 200, optimization for radiator placement can include encroaching on an existing structure or component of the truck 200 in or upon which to dispose the radiators 220. Once the existing truck component or structure is sufficiently modified, the positioning, placement, and/or orientation of the radiator 220 and baffles 224 can be optimized for air flow.

In some embodiments, a size of the hydrogen tanks 106 or fuel tank storage system 104 can be reduced to increase available radiator 220 space 208. For example, as discussed with respect to FIGS. 2A, 2B, and 3, reducing a size of the tanks 106 or fuel tank storage system 104 can increase available space 108 for radiator 120 placement. In some embodiments, placement of the radiators 120 sufficiently parallel to the stacks 112 of hydrogen tanks 106 can be less than optimal due to blockage of the air flow.

For example, during forward motion of the vehicle 100 shown in FIGS. 2A, 2B, and 3, the tanks 106 can block a large portion of air flow to the radiator 120. This blockage of air flow significantly reduces the air flow through the radiator 120 and increases recirculation in the area 140, thereby negatively impacting performance. Placing the radiator 120 on an incline or in an orientation angle 146 with baffles 124, as discussed with respect to FIGS. 5 and 6, can remedy this problem by increasing air flow through the radiator 120 and minimizing recirculation, as noted above.

Returning to FIG. 8, optimized placement of the radiator 220 on a box truck 200 includes modification of the trailer 210 by placing the radiators 220 above the tank storage system 204 that sits on top of the chassis 203. In this orientation, the radiators 220 sit above a level of the cabin 202. In some embodiments of box trucks 200, the fuel cell 126 of a box truck 200 can generate power of approximately 90 kW to about 100 kW.

While 90-100 kW is only half of the power generated by the fuel cells 126 of a Class 8 truck 100 (e.g., about 240 kW power), this level of power (e.g., 90-100 kW) is sufficiently large to benefit from efficient radiator 220 placement to emit the rejected heat. While placement above the tank storage system 204 may not maximize the available space 208 for radiator 220 storage, placing the radiators 220 above the level of the cabin 202 and other truck components also allows for packaging radiator cores with high efficiency electric fans.

Figure 9:
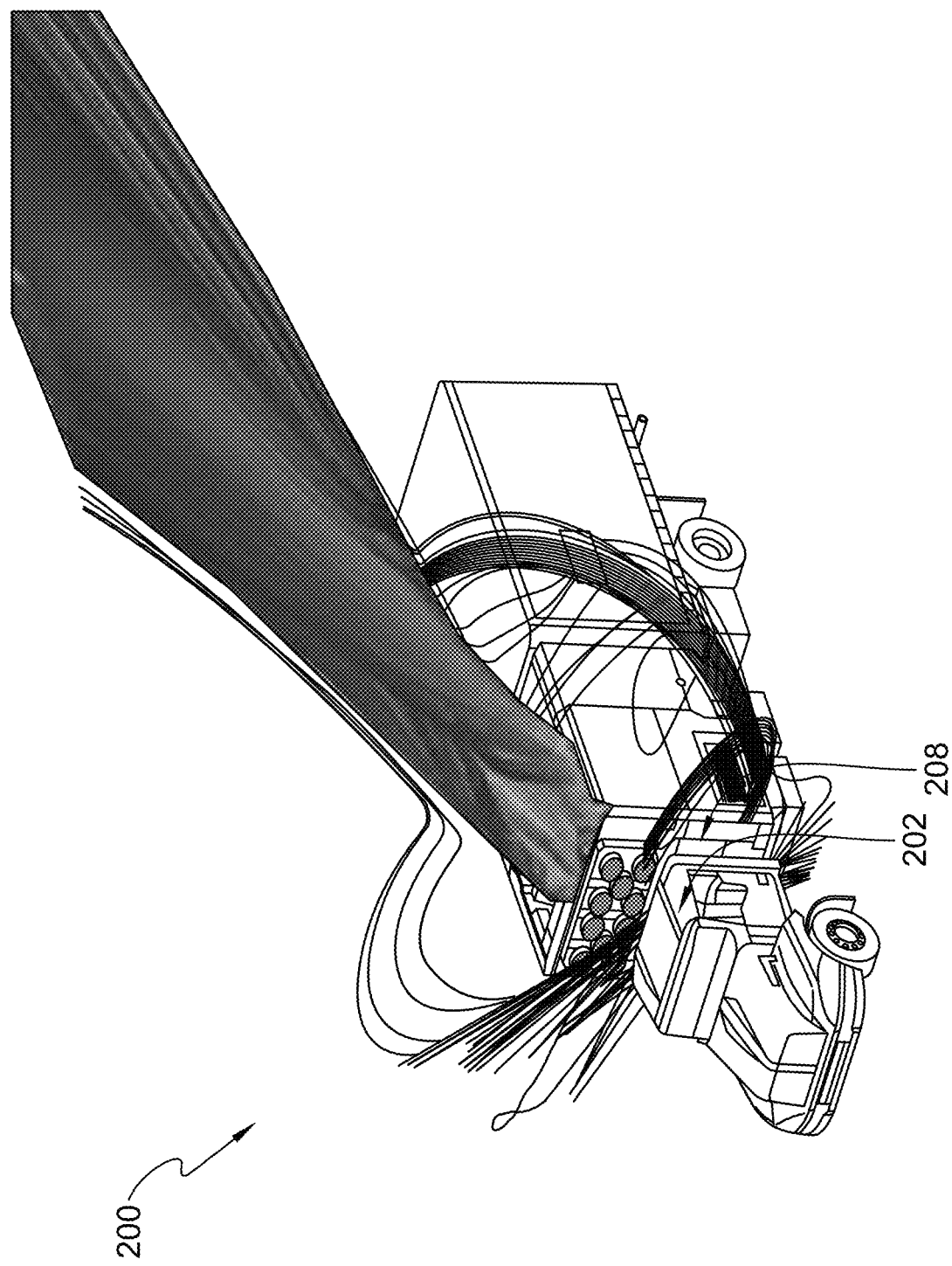
FIG. 9 is a schematic perspective view of air flow going through the radiator of the FCEV of FIG. 8.

Moreover, this location of the radiator 220 above the cabin 202 exposes the radiator 220 to maximum air flow due to no other component of the truck 200 impeding air flow to the radiator 220. This embodiment also allows air to enter and exit the radiator 220 without recirculating the air in that region, as shown in FIG. 9. A person skilled in the art will recognize that optimizing air flow enables reduction in the size of the radiators 220 to compensate for failing to use the maximum available space.

Further optimization of the placement of the radiator 220 includes improved baffle 224 positioning, placement, and/or orientation. For example, rather than, or in addition to angling the radiator 220 at a particular orientation angle 146, in some embodiments, the baffle 224 can be angled, such as the baffle 224 on box trucks 200. In some embodiments, the air flow through the radiator 220 at full power can range from about 12,000 CFM to about 15,000 CFM. In other embodiments, the air flow through the radiator 220 at full power can be up to, and including about 14,000 CFM.

Referring back to FIG. 8, in some embodiments, the baffle 224 can be positioned or in the same orientation or angle as the radiators 120 to which they are configured to attach or connect. In other embodiments, the baffles 224 are positioned in a horizontal orientation only. In yet additional embodiments, the baffles 224 may be positioned such that they are oriented upward to have a baffle angle 228 that ranges from approximately 0 degrees to approximately 75 degrees, including any specific or range of angle comprised therein. The baffle angle 228 may also range from approximately 15 degrees to approximately 75 degrees, from approximately 25 degrees to approximately 65 degrees, in a range of approximately 35 degrees to approximately 55 degrees, or at an angle of approximately 45 degrees. In an exemplary embodiment, the baffle angle 228 is at or about 45 degrees.

Figure 10:
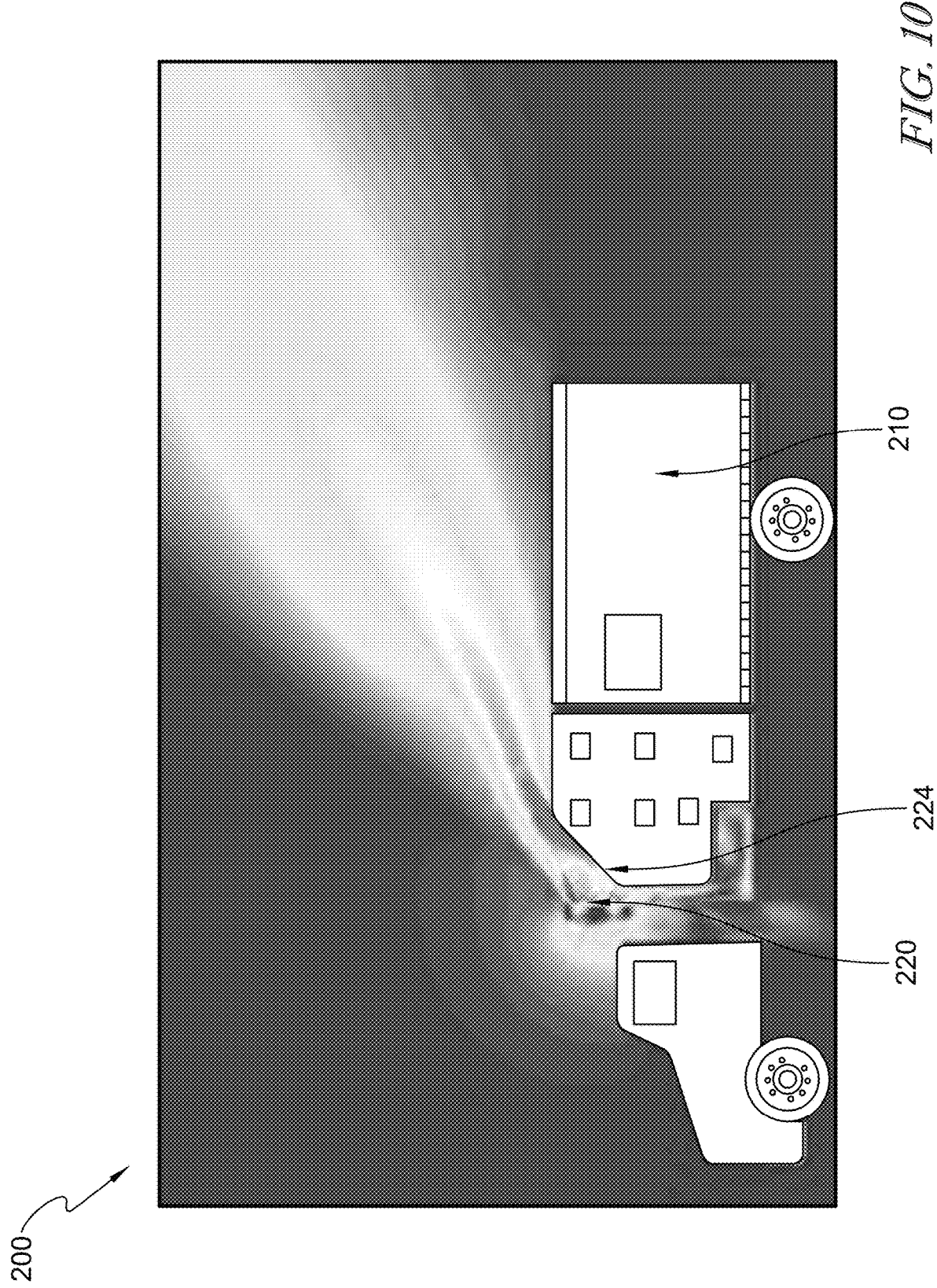
FIG. 10 is a schematic side view of a temperature profile emitted from the radiator of the FCEV of FIG. 8.

Air exiting the radiator 220 can travel along the inclined baffle 224 or the baffle angle 228 and dissipate heat into the ambient environment, as shown in FIG. 10. Air traveling along the inclined baffle 224 or the baffle angle 228 avoid recirculation and maximizing cooling of the fuel cells 126 by the radiators 220 and baffles 224. A comparison of baffle 224 geometries of the present disclosure with a current baffle known in the art was performed to determine which provided maximum fuel cell 126 performance.

Air flow of a currently known baffle when stationary was 6.98 kg/s and 13178 CFM. Three present baffle 224 embodiments comprising structurally geometric improvements, including: 1) a 45 degree wall, 2) a curved wall (concept #4), or 3) a curved duct. Each improved baffle 224 was tested on a vehicle 100 under stationary and driving conditions (e.g., 40 miles per hour). Under stationary conditions, each of the three presently improved baffle 224 embodiments provided about 2% to about 25% improved air flow enabling proportionally increased fuel cell 126 and/or radiator 220 performance, including any specific amount or range of improvement comprised therein, such as about 5% to about 20% improvement.

Specifically, the baffle 224 embodiments of the presently claimed system comprising the 45 degree baffle wall angle demonstrated about 5% to about 20% performance improvement over the current baffle design (e.g., without the 45 degree baffle angle). The baffle 224 embodiment having the curved wall showed about 5% to about 15% improved performance over the current baffle design. The baffle 224 embodiment having the curved duct design showed about 3% to about 10% improved performance over the current baffle design.

Further, when the baffle 224 is angled at 45 degrees (i.e., the baffle angle 228 equals 45°), as described above, the improved performance of the radiator 220 meets the minimum flow requirement (14,000 CFM) at both stationary and driving conditions. Therefore, a 45° baffle angle 228 supports air flow through the radiator 220 that is slightly above full power.

Moreover, in this placement, positioning, and/or orientation, the baffle 224 having a baffle angle 228 and/or the radiator 220 having an orientation angle 146 are integrated and manufactured for optimal fuel cell 126 performance on the vehicle 100 or fuel cell electric vehicle (FCEV) 100. The baffle 224 with a specific baffle angle, along with the radiator 120 with a specific orientation angle 146 are integrated and manufactured to provide optimal fuel cell 126 performance on the vehicle 100 or fuel cell electric vehicle (FCEV) 100. For example, the vehicle may include a baffle 224 that has a baffle angle 228 of at least, no greater than, or about 45 degrees and/or a radiator 220 that has an orientation angle 146 of at least, no greater than, or about 25 degrees to about 45 degrees.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A vehicle radiator integration system to improve fuel cell performance, comprising:
   a tank storage region having one or more tanks stored therein;

one or more radiators associated with the tank storage region, one or more baffles extending between the one or more radiators and the tank storage region, wherein the one or more radiators and the one or more baffles are disposed above a chassis of a vehicle in an orientation that reduces hot air recirculation and air restriction, wherein the one or more radiators or the one or more baffles are located in a gap that is located between adjacent tanks within the tank storage region.

2. The system of claim 1, wherein the orientation of the one or more radiators is vertically parallel or is angled relative to the tank storage region.

3. The system of claim 2, wherein an angle of the orientation of the one or more radiators is in a range of approximately 2 degrees to approximately 45 degrees.

4. The system of claim 1, wherein the one or more baffles are disposed at a top end of the one or more radiators, a bottom end of the one or more radiators, or between the one or more radiators.

5. The system of claim 1, wherein the orientation of the one or more baffles is substantially perpendicular or is angled relative to the tank storage region.

6. The system of claim 5, wherein an angle of the orientation of the one or more baffles is in a range of approximately 15 degrees to approximately 75 degrees.

7. The system of claim 6, wherein the angle of the orientation of the one or more baffles is approximately 45 degrees.

8. The system of claim 1, wherein the one or more baffles are disposed above the tank storage region.

9. The system of claim 1, wherein an area of the gap may extend beyond a length or a width of the chassis of the vehicle.

10. The system of claim 1, wherein the one or more radiators are disposed or located in the gap between adjacent tanks within the tank storage region without blocking one or more valves of the one or more tanks.

11. The system of claim 1, wherein the one or more radiators abut the tank storage region.

12. The system of claim 1, wherein the one or more radiators are positioned in an orientation comprising an outward orientation angle or an upward orientation angle.

13. The system of claim 12, wherein the outward orientation angle or the upward orientation angle ranges from about zero (0) degrees to about 90 degrees.

14. A vehicle radiator integration system to improve fuel cell performance, comprising:

a tank storage region disposed above a chassis of a vehicle having one or more fuel tanks stored therein;

a gap located behind or within the tank storage region comprising one or more radiators or one or more baffles, wherein the one or more radiators are positioned at an orientation angle formed between the tank storage region and a back face of the one or more radiators that faces the tank storage region, wherein an entirety of a top end of the one or more radiators is a first distance from the tank storage region and an entirety of a bottom end of the one or more radiators is a second distance from the tank storage region, the second distance being greater than the first distance, wherein the one or more baffles are positioned at a baffle angle, and wherein the orientation angle of the one or more radiators or the baffle angle of the one or more baffles improves air flow movement and heat ejection.

15. The system of claim 14, wherein the orientation angle of the one or more radiators ranges from approximately 5 degrees to approximately 90 degrees.

16. The system of claim 14, wherein the orientation angle of the one or more radiators is about 45 degrees.

17. The system of claim 14, wherein the baffle angle of the one or more baffles or the orientation angle of the one or more radiators is approximately 45 degrees.

18. The system of claim 14, wherein the one or more radiators do not abut the tank storage region.

19. The system of claim 18, wherein the one or more baffles connect the one or more radiators with the tank storage region.

20. The system of claim 14, wherein the one or more baffles are positioned at the top end and at the bottom end of the one or more radiators.

* * * * *